United States Patent
Gammon

(10) Patent No.: US 8,914,477 B2
(45) Date of Patent: Dec. 16, 2014

(54) SYSTEM AND METHOD FOR USING A PORTABLE ELECTRONIC DEVICE AS A SECURE VIRTUAL MASS STORAGE DEVICE OVER A NETWORK

(75) Inventor: Scott P. Gammon, Waterloo (CA)

(73) Assignee: BlackBerry Limited, Waterloo (CA)

(*) Notice: Subject to any disclaimer, the term of this patent is extended or adjusted under 35 U.S.C. 154(b) by 10 days.

(21) Appl. No.: 12/392,187

(22) Filed: Feb. 25, 2009

(65) Prior Publication Data

US 2010/0217871 A1 Aug. 26, 2010

(51) Int. Cl.
G06F 15/177 (2006.01)
H04W 12/02 (2009.01)
H04L 29/08 (2006.01)
H04L 29/06 (2006.01)

(52) U.S. Cl.
CPC .......... *H04W 12/02* (2013.01); *H04L 63/0272* (2013.01); *H04L 67/1097* (2013.01); *H04L 67/04* (2013.01)
USPC .......... 709/220; 709/219; 709/227; 709/231; 707/792; 710/105; 726/3

(58) Field of Classification Search
CPC ... H04L 63/0272; H04L 67/04; H04W 12/02; G06F 21/85; G06F 3/0605; G06F 21/78
USPC .......... 709/219, 227, 231; 707/174, 168, 792; 710/105; 726/3
See application file for complete search history.

(56) References Cited

U.S. PATENT DOCUMENTS

| 7,093,098 B2 | 8/2006 | Klein et al. |
| 7,280,843 B2 | 10/2007 | Lection et al. |
| 2004/0154014 A1* | 8/2004 | Bunger .......... 717/174 |
| 2007/0156710 A1* | 7/2007 | Kern et al. .......... 707/100 |
| 2007/0156850 A1* | 7/2007 | Corrion .......... 709/219 |
| 2007/0294457 A1* | 12/2007 | Gantman et al. .......... 710/313 |

(Continued)

FOREIGN PATENT DOCUMENTS

EP 2015213 1/2009

OTHER PUBLICATIONS

LinkSys USB VPN and Firewall Adapter http://www.smallnetbuilder.com/contnet/view/24624/5.

(Continued)

*Primary Examiner* — Hitesh Patel
(74) *Attorney, Agent, or Firm* — Norton Rose Fulbright Canada LLP

(57) ABSTRACT

A wireless device is provided. The wireless device has a processor for controlling operation of the wireless device; a first input device coupled to the processor for accepting an input; at least one display device coupled to the processor for communicating an output to the user; a communications subsystem coupled to the processor for communicating with a communications network; a universal serial bus (USB) storage device connected to a USB port of the wireless device; a memory coupled to the processor; and a storage device coupled to the processor. The wireless device includes a USB/network handling module resident in the memory for execution by the processor. The USB/network handling module is configured to establish a secure connection between the wireless device and a server of a network; load a universal serial bus mass storage component; initiate a file share between the wireless device and the server; and mount the USB storage device connected to the USB port of the wireless device as a shared network drive on the network.

14 Claims, 6 Drawing Sheets

(56) References Cited

U.S. PATENT DOCUMENTS

2008/0005260 A1* 1/2008 Belimpasakis et al. ....... 709/212
2009/0171785 A1* 7/2009 Kano et al. ...................... 705/14
2010/0146000 A1* 6/2010 Greggs et al. ................. 707/792
2010/0169071 A1* 7/2010 Oltuszyk et al. ................ 703/24

OTHER PUBLICATIONS

USB Over Network 3.4.6—Share USB devices over a LAN or the Internet http://www.download3000.com/download__12117.html.

Share Printers and Access Your Media Wirelessly with the Belkin Network USB Hub http://www.belkin.com/pressroom/releases/uploads/05__15__07NetworkUSBHub.html.

Gabriel Torres—"How to share Folders and Printers on Your Network" Nov. 14, 2005 http://www.hardwaresecrets.com/printpage/247 [retrieved on May 26, 2010].

European Patent Office, Office Communication pursuant to Article 94(3) EPC, dated Jun. 27, 2011, in respect of European Patent Application No. 09153624.3-2212.

Robert Cowart and Brian Knittel, "Special Edition Using Microsoft Windows XP Professional", published by Que on Jun. 12, 2004, pp. 591-593, 623-624.

Robert Cowart and Brian Knittel, "Special Edition Using Microsoft Windows XP Professional", published by Que on Jun. 12, 2004, pp. 569-576.

Robert Cowart and Brian Knittel, "Special Edition Using Microsoft Windows XP Professional", published by Que on Jun. 12, 2004, pp. 986-992.

European Patent Office, Office Communication issued Jul. 10, 2009, in respect of European Patent Application No. 09153624.3.

Barker Brettell, Response to European Office Communication, dated Nov. 17, 2009, in respect of European Patent Application No. 09153624.3.

European Patent Office, Office Communication issued Jun. 1, 2010, in respect of European Patent Application No. 09153624.3.

Barker Brettell, Response to European Office Communication, dated Oct. 5, 2010, in respect of European Patent Application No. 09153624.3.

Barker, Brettell, Response to Examination Report filed in respect of European Patent Application No. 09153624.3, dated Oct. 26, 2011.

European Patent Office, Summons to Attend Oral Proceedings dated Mar. 27, 2012, issued in respect of European Patent Application No. 09153624.3-2212 / 2224326.

Barker Brettell, Response to Summons to Attend Oral Hearings filed Aug. 2, 2012 in European Patent Application No. 09153624.3.

Canadian Intellectual Property Office, Examiner's Requisition dated Jul. 6, 2012, in Canadian Patent Application No. 2,691,486.

Canadian Intellectual Property Office, Examiner's Requisition dated Apr. 5, 2013, issued in Canadian Patent Application No. 2,691,486.

Norton Rose, Response to Examiner's Requisition dated Dec. 18, 2012, filed in Canadian Patent Application No. 2,691,486.

European Patent Office, Decision to Refuse a European Patent Application dated Nov. 6, 2012, issued in European Patent Application No. 09153624.3.

European Patent Office, Minutes of Oral Proceedings dated Oct. 31, 2012, issued in European Patent Application No. 09153624.3.

Norton Rose Fulbright, Response to Examiner's Requisition dated Oct. 10, 2013, filed in Canadian Patent Application No. 2,691,486.

Canadian Intellectual Property Office, Examiner's Requisition Dated May 16, 2014, issued in Canadian Patent Application No. 2,691,486.

\* cited by examiner

SYSTEM AND METHOD FOR USING A PORTABLE ELECTRONIC DEVICE AS A SECURE VIRTUAL MASS STORAGE DEVICE OVER A NETWORK

TECHNICAL FIELD

The present disclosure relates generally to portable devices, and more particularly to a system and method for using a portable electronic device as a secure virtual mass storage device over a network.

BACKGROUND

People increasingly have portable electronic devices, such as cellular phones, personal digital assistants, pagers, etc. Many portable electronic devices have increasingly large amounts of storage space for data, be it integrated internal storage or storage provided by way of a memory card or USB memory device that is inserted in or plugged into the device.

Conventional portable electronic devices make it difficult to externally access this storage space using a separate computer such as a desktop PC, particularly if the user does not have the required cable available to connect the portable electronic device to the PC. Further, portable electronic devices that require further storage space while mobile beyond what is available internally to the device have no options for additional storage space while mobile.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

One aspect of the description provides a wireless device. The wireless device has a processor for controlling operation of the wireless device; a first input device coupled to the processor for accepting an input; at least one display device coupled to the processor for communicating an output to the user; a communications subsystem coupled to the processor for communicating with a communications network; a universal serial bus (USB) storage device connected to a USB port of the wireless device; a memory coupled to the processor; and a storage device coupled to the processor. The wireless device includes a plurality of modules resident in the memory for execution by the processor, the plurality of modules including a USB/network handling module. The plurality of modules are configured to establish a secure connection between the wireless device and a server of a network; load a universal serial bus mass storage component; initiate a file share between the wireless device and the server; and mount the USB storage device connected to the USB port of the wireless device as a shared network drive on the network.

Another aspect of the description provides a method for mounting memory of a wireless device as a shared network drive on a network. The method comprises establishing a secure connection between the wireless device and a server of the network; loading a universal serial bus (USB) mass storage component on the wireless device; initiating a file share between the wireless device and the server; and mounting the memory of the wireless device as a shared network drive on the network. The memory of the wireless device may include one of internal random access memory (RAM); internal read-only memory (ROM); internal flash memory; a flash memory module inserted into the wireless device (102); a memory module inserted into the wireless device (102); a universal serial bus (USB) flash drive plugged into the wireless device; and a universal serial bus (USB) hard drive plugged into the wireless device.

Figure 1:
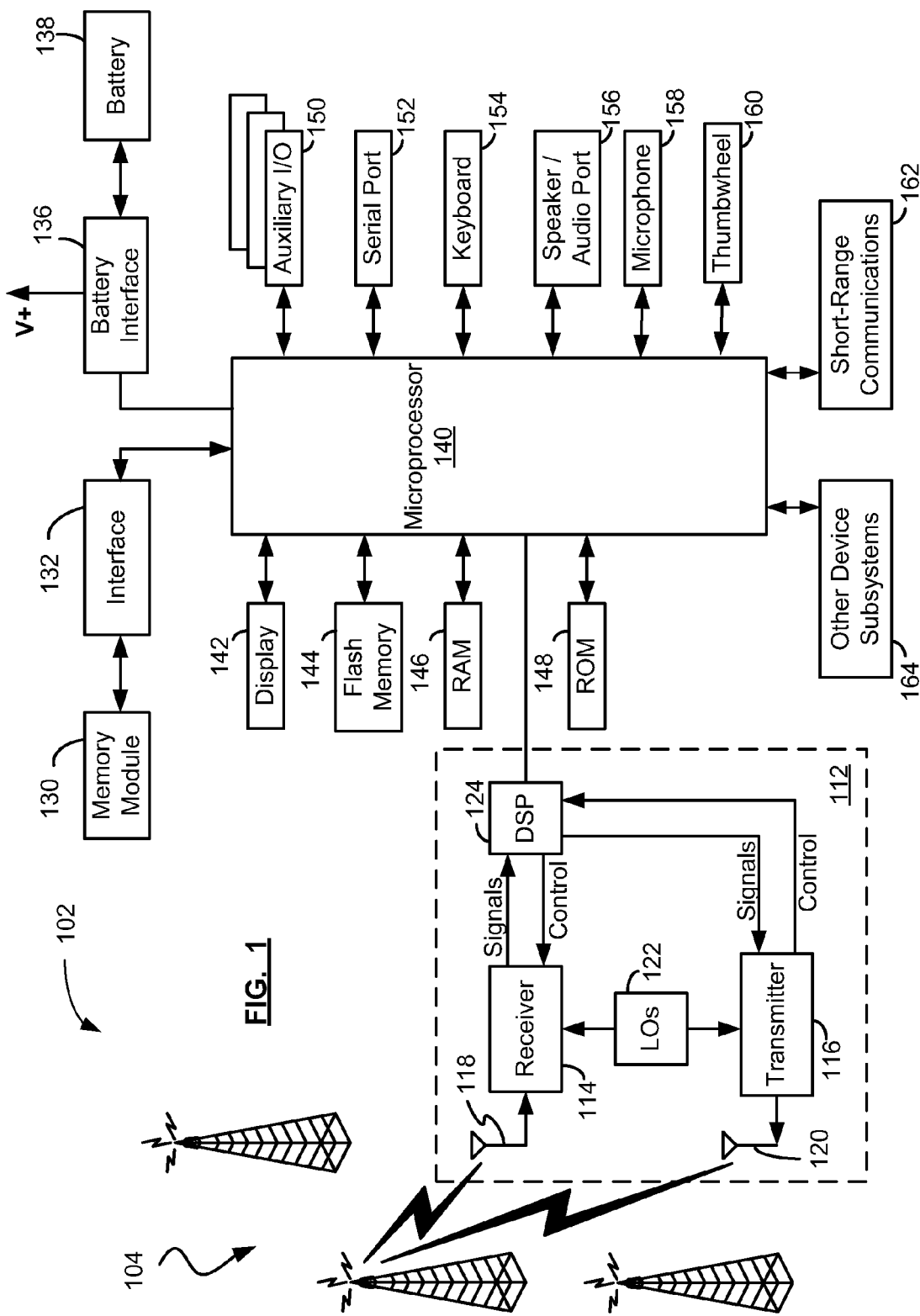
FIG. 1 shows in block diagram form a wireless device suitable for being used as a virtual mass storage device over a network in accordance with one embodiment.

Reference is first made to FIG. 1, which shows a block diagram illustrating a portable wireless device 102 that may be used as a virtual mass storage device over a network in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices such as external hard drives, flash drives, or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
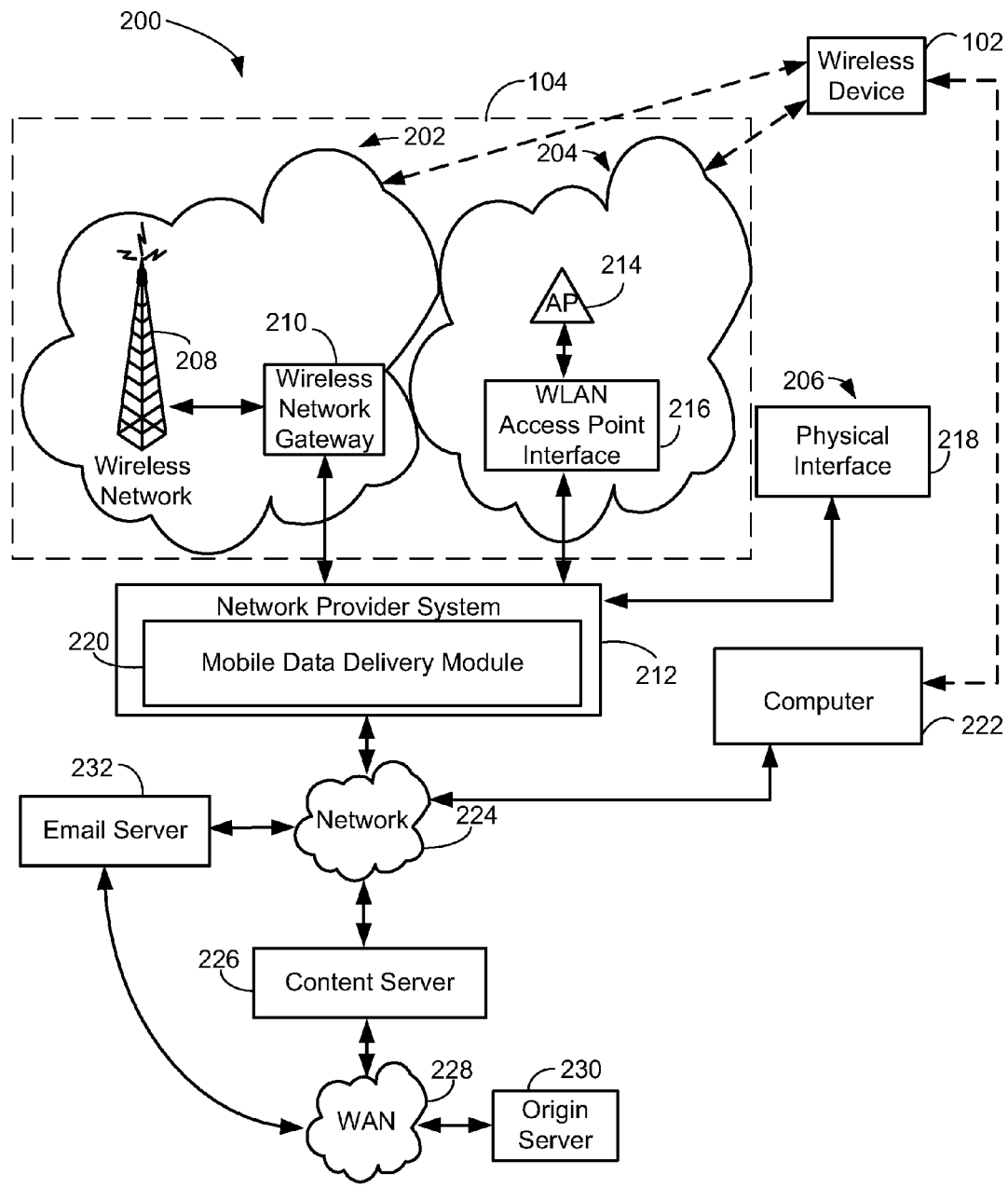
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
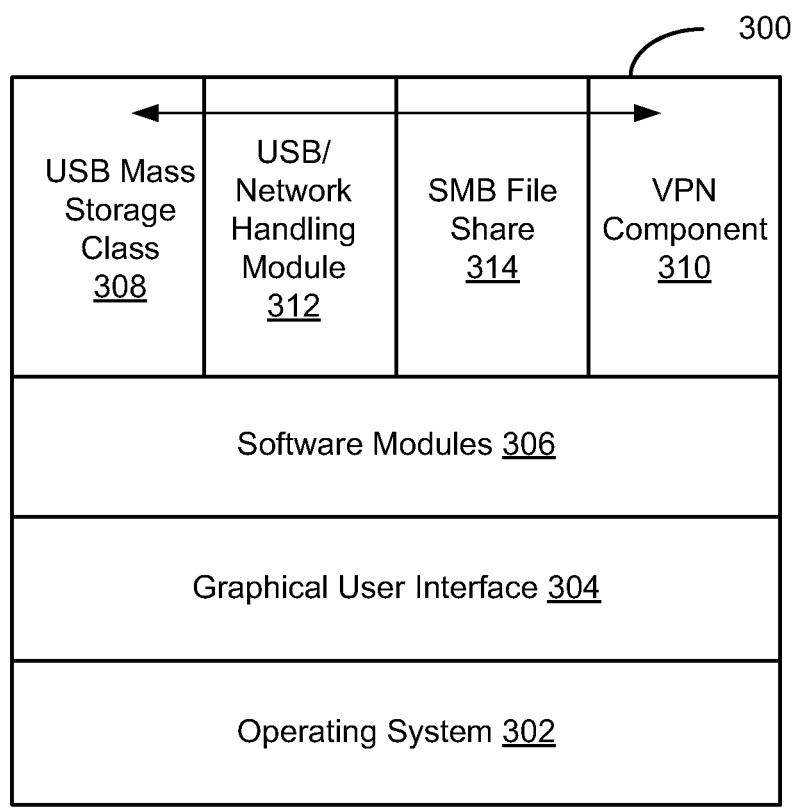
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a USB mass storage component 308, a VPN component 310 that is used for connecting with virtual private networks (VPNs) and may interact with, in one example, a file share component or protocol 314 such as a server message block (SMB) file share protocol, and a USB/Network handling module 312. In one example, the USB mass storage component 308 may be a class. In one example, each of the components 308, 310, 312, and 314 may be integrated into the operating system 302. Alternatively, the components 308, 310, 312, and 314 may be separate software components, as illustrated in FIG. 3. In one example, the USB mass storage component 308 may be a component of the operating system 302 and is responsible for handling USB interfacing aspects where the wireless device 102 is presented as a mass storage device. The USB mass storage class may be a set of computing communications protocols defined by the USB Implementers Forum that run on the Universal Serial Bus; this standard provides an interface to a variety of storage devices. For example, when the wireless device 102 is connected to a computing device using a USB cable (e.g., the computer 222), any internal memory of the wireless device 102 and/or any memory cards or external mass storage devices inserted into or plugged into the wireless device 102 (e.g., memory module 130, flash memory 144, RAM 146, ROM 148, other device subsystems 164, and/or external USB storage device plugged into the serial port 152) may be presented on the computer 222 as one or more USB mass storage devices accessible by the computer 222. The USB mass storage component 308 is responsible for handling this interaction from the perspective of the wireless device 102.

In another example, the VPN component 310 may be responsible for handling most or all aspects of the wireless device 102 joining and participating in a VPN, either wirelessly or using a wired connection. The VPN component 310 may also store the VPN credentials needed to authenticate the wireless device 102 with the user's corporate or enterprise network. Further, the VPN component 310 may handle access to various devices through the VPN. In one example, the VPN component 310 may interact closely with the sever message block (SMB) protocol 314, an application-level network protocol mainly used to provide shared access to files, printers, serial ports, and miscellaneous communications between nodes on a network. SMB may be used to mount volumes on a network, for example if the wireless device 102 needed to access files stored on a particular server on the VPN.

In accordance with one aspect of the present disclosure, if USB devices are to be mounted as drives in a VPN and to be available across a VPN, an interface between the USB mass storage component 308 and the VPN component 310 needs to be facilitated. The USB/Network handling module 312 may handle this task, and may be responsible primarily for translating file system requests from the network to USB requests. This is described in more detail below in connection with FIG. 5.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
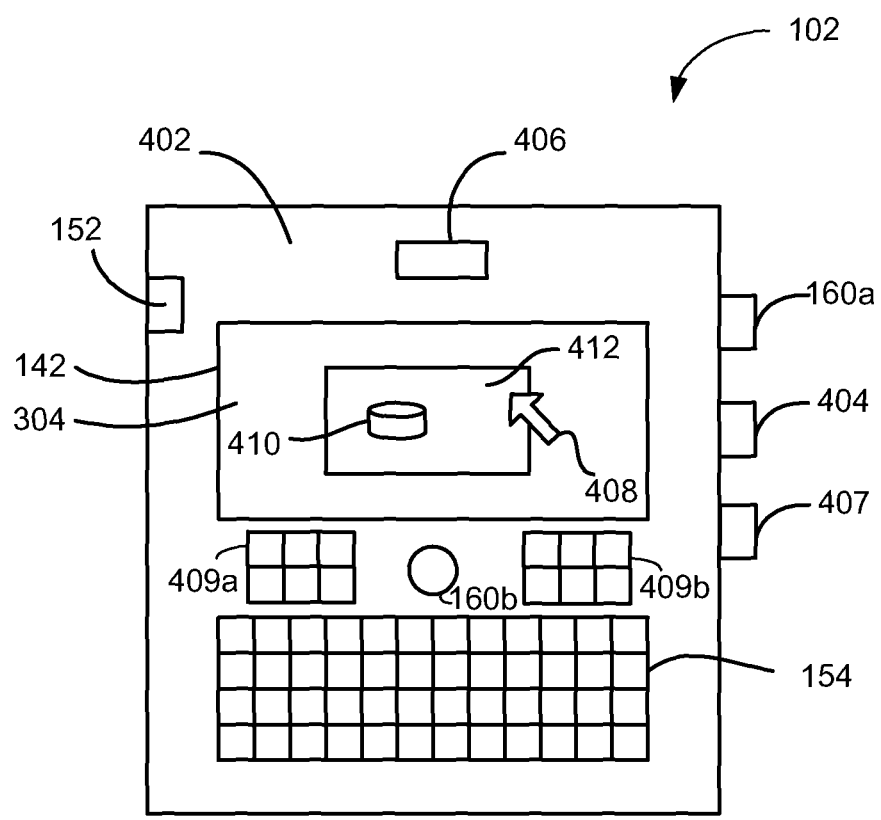
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Figure 5:
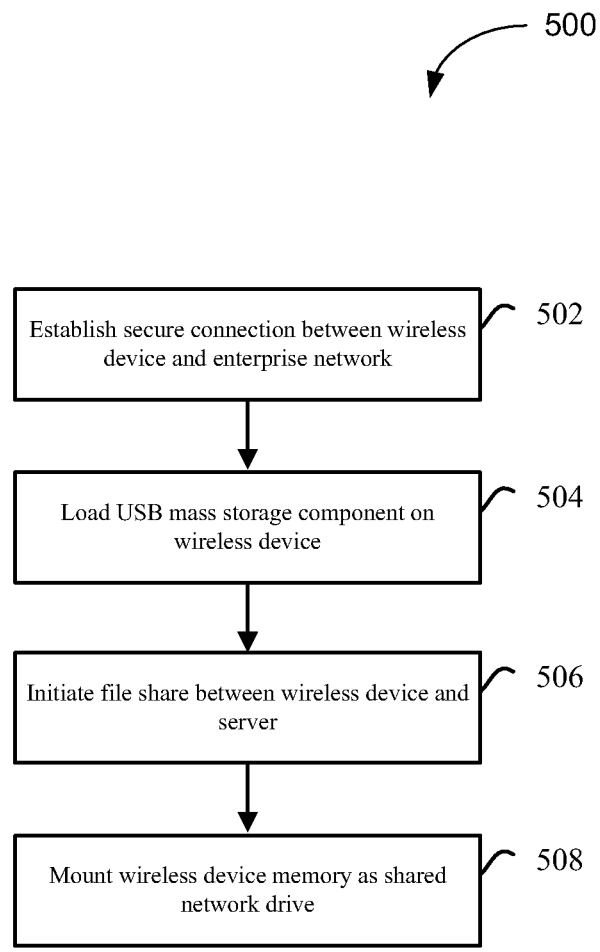
FIG. 5 shows in flowchart form a method for mounting wireless device memory as a shared network drive in accordance with one embodiment.

Reference is next made to FIG. 5, which shows in flowchart form a method 500 for mounting wireless device memory as a shared network drive in accordance with one embodiment. In one example, the wireless device memory to be mounted as a shared network drive may be an external USB flash drive or hard drive plugged into the serial port 152 of the wireless device 102. At a first block 502, a user may be using the wireless device 102 and may establish a secure connection between the wireless device 102 and a server on the user's enterprise network (e.g., the content server 226 or the origin server 230). In one example, the secure connection may be a virtual private network (VPN) connection. This may allow the user to establish a secure connection with a server on the user's enterprise network over what may otherwise be an insecure connection. This VPN connection may be managed by the VPN component 310. The VPN connection may be initiated at the request of the user, or automatically in response to the availability of any of a particular type of connection. For example, the wireless device 102 may detect the presence of a relatively high speed connection, such as an authorized Wi-Fi network or a 3G or 4G network and may automatically join the VPN. The VPN component typically already has the credentials needed to join the user's VPN saved in the memory 300. Alternatively, the user may be prompted to enter credentials to join the VPN.

At a second block 504, the USB mass storage component 308 may be loaded by the wireless device 102 in preparation for the mounting of a USB mass storage device, such as a flash drive or hard drive. This may be performed automatically when a USB device is plugged into the wireless device 102, if the user has set configuration settings to indicate that memory of the wireless device 102 should always be made available as a shared network resource when the wireless device 102 is connected to the VPN. Alternatively, the user may choose when memory of the wireless device should be mounted as a shared network resource and the USB mass storage component 308 may be loaded in response to such a selection by the user.

Next, at a block 506, a file share may be initiated between the wireless device 102 and the server. In one example, the file share may be server message block (SMB) file share. This may also be performed automatically, if the user has set configuration settings to indicate that memory of the wireless device 102 should always be made available as a shared network resource when the wireless device 102 is connected to the VPN. Alternatively, the user may choose when memory of the wireless device should be mounted as a shared network resource and the file share may be initiated in response to such a selection.

Finally, at a block 508, the USB/Network handling module 312 mounts the memory of the wireless device 102 as a shared network drive by bridging the gap between the USB mass storage component 308, which may be a conventional means for mounting wireless device memory as a USB mass storage device when the device is connected to a personal computer through a serial cable, and the file share 310, which may be a conventional means for mounting a network drive in a VPN. It is intended that wireless device memory 300, as referred to in the present application, is intended to include any memory and/or storage device in or connected to the wireless device 102 that would normally be or may be communicated with through the USB mass storage class 308.

By mounting the memory 300 of the wireless device 102 as a network share, the internal memory or attached storage device 300 of the wireless device 102 become available to any computer connected to the server of the enterprise network. For example, the memory 300 of the wireless device 102, which is available as a network share, may be mounted as a network drive on the user's personal computer and the user may have access to the memory 300 of the wireless device 102 without having to physically connect the wireless device 102 to a computer 222. This allows the user to manipulate (e.g., copy, move, delete, etc.) files on the wireless device 102 in the same manner as the user would manipulate files on any storage device available to his personal computer. The user may also do so using any computer attached to the enterprise network. The method 500 may be applicable with the wireless device 102 using any means of connectivity to the user's enterprise network (e.g., WLAN 204, the WAN 202, the physical connection 218, and/or the serial connection to the computer 222).

The method 500 may provide a number of advantages. In one example, if the user forgets his wireless device at home and the wireless device is connected to the user's home Wi-Fi connection, the memory 300 of the wireless device 102 may be available to the user at work as a shared network drive. In another example, the wireless device 102 may be used to share files locally where connecting via USB cable is not an option (e.g., there is no physical access to a computer with a USB port, if the user was using some sort of a terminal, for example). A user may also use the wireless device 102 for backing up or collecting data from a remote site that otherwise lacks network connectivity. Further, a standalone presentation system capable of playing files on a network (e.g., a ceiling mounted projector) may be fed with video data from a portable harddrive without physically running a cable to the projector. The same concept may apply to using a networked printer to print documents as printers often have network connectivity, but needn't have USB support for external storage.

The method 500 may also operate in a complementary fashion where a corporate network share may be mounted as a local USB device on the wireless device 102, as explained in more detail below in connection with FIG. 6.

Figure 6:
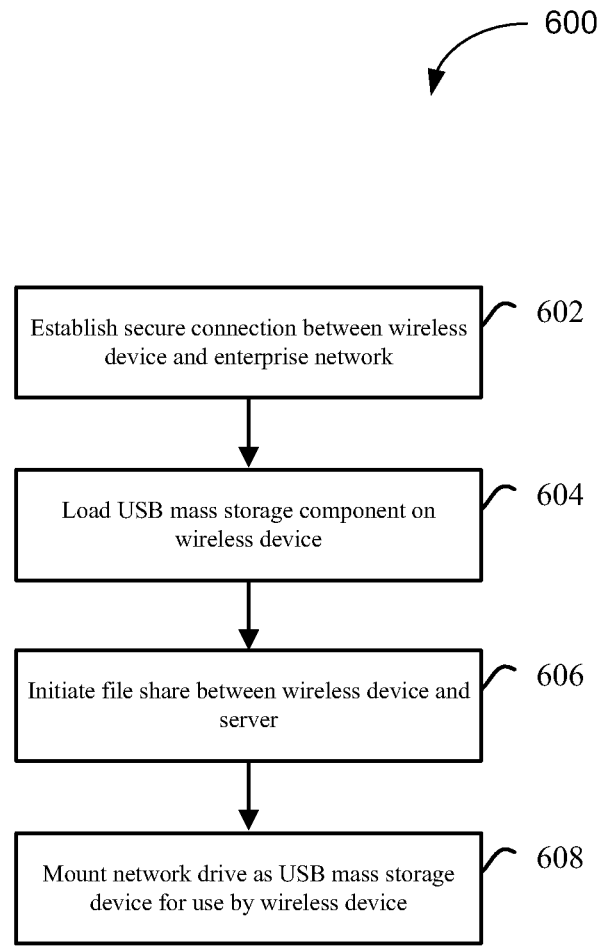
FIG. 6 shows in flowchart form a method for mounting a network drive as a USB mass storage device on the wireless device in accordance with one embodiment.

Reference is next made to FIG. 6, which shows in flowchart form a method 600 for mounting a network drive as a USB mass storage device for a wireless device in accordance with one embodiment. At a first block 502, a user may be using the wireless device 102 and may establish a secure connection between the wireless device 102 and a server or remote personal computer (PC) on the user's enterprise network (e.g., the content server 226 or the origin server 230 or any remote PC). In one example, the secure connection may be a virtual private network (VPN) connection. This VPN connection may be managed by the VPN component 310. The VPN connection may be initiated at the request of the user, or automatically in response to the availability of any of a particular type of connection. For example, the wireless device 102 may detect the presence of a relatively high speed connection, such as an authorized Wi-Fi network or a 3G or 4G network and may automatically join the VPN. The VPN component typically already has the credentials needed to join the user's VPN saved in the memory 300. Alternatively, the user may be prompted to enter credentials to join the VPN.

At a second block 604, the USB mass storage component 308 may be loaded by the wireless device 102 in preparation for the mounting of a USB mass storage device. For example, the wireless device 102 may be connected to a local PC using a USB cable and the USB mass storage component 308 maybe used to provide storage accessible to the wireless device 102 for use by the PC over the USB connection. This may be performed automatically, if the user has set configuration settings to indicate that enterpriser network drives should always be made available to the wireless device 102 and/or device connected to the wireless device 102 serial port 152 as simulated local USB drives when the wireless device 102 is connected to the VPN. Alternatively, the user may choose when network drives should be mounted as a simulated USB drives and the USB mass storage component 308 may be loaded in response to such a selection by the user.

Next, at a block 606, a file share may be initiated between the wireless device 102 and the server and/or remote PC. In one example, the file share may be server message block (SMB) file share. This may be performed automatically, if the user has set configuration settings to indicate that enterprise network drives should always be made available to the wireless device 102 or a connected PC as simulated local USB drives when the wireless device 102 is connected to the VPN. Alternatively, the user may choose when network drives should be mounted as a simulated USB drives and the USB mass storage component 308 may be loaded in response to such a selection by the user.

Finally, at a block 608, the USB/Network handling module 312 mounts the network drive as a simulated local USB device for use by the wireless device 102 and/or PC connected to the wireless device 102 by USB by functioning as an interface between the USB mass storage component 308, which may be a conventional means for mounting devices as a USB mass storage device when the device is connected to a personal computer through a serial cable, and the file share component or protocol 314, which may be a conventional means for mounting a network drive in a VPN.

By mounting a network shared drive as a USB mass storage device on the wireless device 102, the wireless device 102 and devices connected to the wireless device 102 serial port 152 are able to access network storage located on a remote server or computer of the user's corporate LAN as a local mass storage device. This is useful to the user of the wireless device 102 if the internal memory 300 of the wireless device 102 becomes full and the user needs space to store additional material, or if the user wishes to save files for easy access, or if the user needs to use his wireless device 102 as a bridge to his enterprise network and make this accessible to a local PC.

This allows the user to manipulate (e.g., copy, move, delete, etc.) files on the enterprise network in the same manner as the user would manipulate files locally on the wireless device 102 and/or a connected PC. The method 600 may be applicable with the wireless device 102 using any means of connectivity to the user's enterprise network (e.g., WLAN 204, the WAN 202, the physical connection 218, and/or the serial connection to the computer 222).

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for mounting a physical internal memory of a wireless device as a private shared network drive on a virtual private network (VPN) to make the physical internal memory of the wireless device available as a private shared network drive on the VPN, the method comprising:

presenting the physical internal memory of the wireless device as a universal serial bus (USB) mass storage device using a USB mass storage component of the wireless device configured to interface with the physical internal memory;

establishing a private secure connection between the wireless device and a server of the network on the VPN;

establishing a connection between a universal serial bus (USB) mass storage component of the wireless device and a physical internal memory of the wireless device;

initiating a private file share between the wireless device and the server over the private secure connection using a file share component of the wireless device configured to mount mass storage devices as network drives on the VPN; and bridging the USB mass storage component of the wireless device and the file share component of the wireless device, to mount the physical internal memory as a private shared network drive on the VPN, by translating file system requests from the VPN to USB device requests, thereby making the physical internal memory of the wireless device available as a private shared network drive on the VPN;

wherein the physical internal memory of the wireless device includes at least one of: physical internal random access memory (RAM); physical internal read-only memory (ROM); physical internal flash memory; a physical internal memory module connected to the wireless device; and a physical internal memory module connected to the wireless device;
wherein the VPN includes at least one of a local area network and a wide area network, and communication between the wireless device and the server occurs wirelessly over one or more of the wide area network and the local area network.

2. The method according to claim 1, wherein the file share component includes the server message block (SMB) protocol.

3. The method according to claim 1, wherein the USB mass storage component is a USB mass storage class.

4. The method according to claim 2, wherein interface between the USB mass storage component and the SMB protocol is facilitated by a USB/Network handling component of module running on the wireless device.

5. The method according to claim 1, wherein the physical internal memory of the wireless device is accessible as a shared network drive to all authenticated users on the network.

6. A wireless device comprising:
a communications subsystem for communicating with a communications network;
a physical internal memory; and
a processor, in communication with the communications subsystem and the physical internal memory, and configured to:
present the physical internal memory of the wireless device as a universal serial bus (USB) mass storage device using a USB mass storage component of the wireless device configured to interface with the physical internal memory;
establish a private secure connection between the wireless device and a server on a virtual private network (VPN);
establish a connection between a universal serial bus (USB) mass storage component of the wireless device and the physical internal memory;
initiate a private file share between the wireless device and the server over the private secure connection using a file share component of the wireless device configured to mount mass storage devices as network drives on the VPN; and
bridge the USB mass storage component of the wireless device and the file share component of the wireless device, to mount the physical internal memory as a private shared network drive on the VPN, by translating file system requests from the VPN to USB device requests, thereby making the physical internal memory of the wireless device available as a private shared network drive on the VPN;
wherein the VPN includes at least one of a local area network and a wide area network, and communication between the wireless device and the server occurs wirelessly over one or more of the wide area network and the local area network.

7. The wireless device according to claim 6, further comprising a USB port connected to a USB storage device comprising at least one of: a USB flash drive and a USB hard drive, wherein the processor is further configured to mount the USB storage device as a private shared network drive on the VPN.

8. The wireless device according to claim 6, wherein the file share component includes the server message block (SMB) protocol.

9. The wireless device according to claim 6, wherein the USB mass storage component is a USB mass storage class.

10. The wireless device according to claim 8, wherein interface between the USB mass storage component and the SMB protocol is facilitated by a USB/network handling component of module running on the wireless device.

11. The wireless device according to claim 6, wherein the physical internal memory of the wireless device is accessible as a shared network drive to all authenticated users on the VPN.

12. The wireless device according to claim 6, wherein the processor is further configured to implement the USB mass storage component, the file share component, and a VPN component.

13. A method for mounting an physical external memory connected to a wireless device as a shared network drive on a virtual private network (VPN), the method comprising:
presenting the physical external memory connected to the wireless device as a universal serial bus (USB) mass storage device using a USB mass storage component of the wireless device configured to interface with the physical external memory;
establishing a private secure connection between the wireless device and a server of the network on the VPN;
establishing a connection between a universal serial bus (USB) mass storage component of the wireless device and an physical external memory physically connected to the wireless device;
initiating a private file share between the wireless device and the server over the private secure connection using a file share component of the wireless device configured to mount mass storage devices as network drives on the VPN; and
bridging the USB mass storage component of the wireless device and the file share component of the wireless device, to mount the physical external memory as a private shared network drive on the VPN, by translating file system requests from the VPN to USB device requests, thereby making the physical external memory connected to the wireless device available as a private shared network drive on the VPN;
wherein the VPN includes at least one of a local area network and a wide area network, and communication between the wireless device and the server occurs wirelessly over one or more of the wide area network and the local area network.

14. A wireless device comprising:
a communications subsystem for communicating with a communications network;
a physical internal memory; and
a processor, in communication with the communications subsystem and the physical internal memory, and configured to:
present an physical external memory connected to the wireless device as a universal serial bus (USB) mass storage device using a USB mass storage component of the wireless device configured to interface with the physical external memory;
establish a private secure connection between the wireless device and a server on a virtual private network;
establish a connection between a universal serial bus (USB) mass storage component of the wireless device and an physical external memory physically connected to the wireless device;
initiate a private file share between the wireless device and the server over the private secure connection using a file share component of the wireless device configured to mount mass storage devices as network drives on the VPN; and
bridge the USB mass storage component of the wireless device and the file share component of the wireless device, to mount the physical external memory as a private shared network drive on the VPN, by translating file system requests from the VPN to USB device requests, thereby making the physical external memory connected to the wireless device available as a private shared network drive on the VPN;

wherein the VPN includes at least one of a local area network and a wide area network, and communication between the wireless device and the server occurs wirelessly over one or more of the wide area network and the local area network.

\* \* \* \* \*